July 20, 1926.

J. A. THARRINGTON

DISTRIBUTOR

Filed June 30, 1924

1,593,517

John A. Tharrington
INVENTOR

BY Victor J. Evans
ATTORNEY

WITNESS: Gerald Hennesy

Patented July 20, 1926.

1,593,517

UNITED STATES PATENT OFFICE.

JOHN ARTHUR THARRINGTON, OF ROCKY MOUNT, NORTH CAROLINA.

DISTRIBUTOR.

Application filed June 30, 1924. Serial No. 723,337.

This invention relates to an agricultural implement, the general object of the invention being to provide means for distributing fertilizer and the like, with means for controlling the flow of material from the device.

Another object of the invention is to provide means whereby two different kinds of fertilizer can be distributed at the same time and to provide means for mixing the fertilizer with the soil as the implement is drawn along.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1:
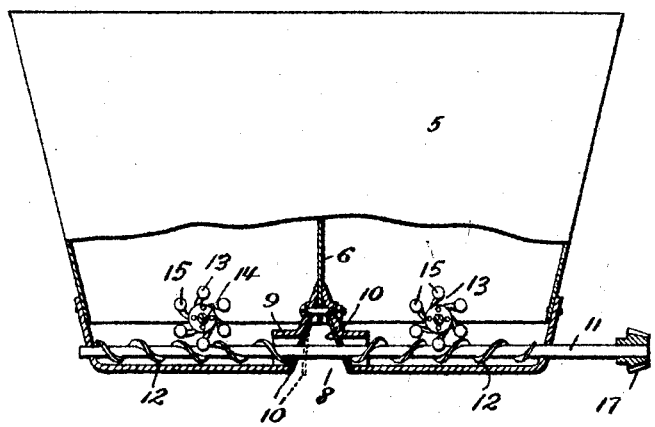
Figure 1 is an elevation of the hopper or body with parts in section.
Figure 2:
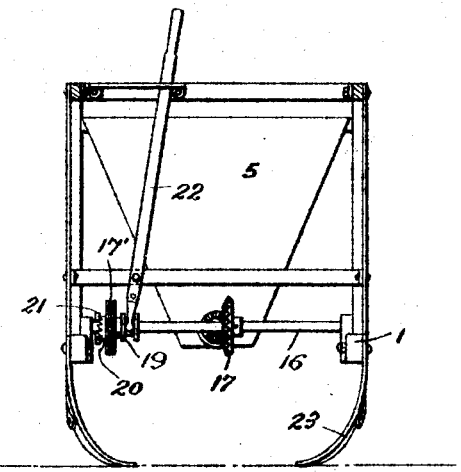
Figure 2 is a transverse section through parts of the supporting frame.

In the drawings the numerals indicate a frame which may be supported for transportation by any well known traction means. A hopper 5 is supported by the frame and said hopper is divided into two chambers by a partition 6. A discharge opening 8 is centrally arranged at the bottom of the hopper and each chamber is provided with a tubular discharge member 9 which communicates with said opening 8. Flap valves 10 normally close the outer ends of the members 9 and a shaft 11 passes along the bottom of the hopper and is journaled in the walls thereof. The shaft passes through openings formed in the valves 10 and a pair of spirals 12 are formed on the shaft, one spiral being arranged in one chamber and the other in the other chamber with the adjacent ends of the spirals entering the tubular members 9 and said spirals being oppositely arranged so that as the shaft is rotated the material in the chambers will be forced through the tubular members 9 and will drop from the opening 8 upon the ground. The material forced into the member 9 will act to open the valve. An agitator 13 is arranged in each chamber upon a shaft 14 which is journaled in the walls of the chamber and the agitator is provided with enlarged parts 15 at the ends of its arms which are engaged by the spiral so that the agitator will be rotated as the shaft 11 is rotated. The shaft 11 is driven from a cross shaft 16 by means of the gears 17 and said cross shaft is rotated from the ground wheel through means of the endless chain 17' and the sprockets 19. The sprocket 19 on the shaft 16 is slidably mounted thereon and is provided with the clutch 20 for engaging a pin 21 carried by the shaft so that when the clutch is in engagement with the pin, shaft 16 will be rotated when the implement is moving along the ground but when the clutch is out of engagement with the pin the sprocket will simply rotate on the shaft without rotating the same. The clutch and sprocket are shifted on the shaft by means of the hand lever 22 which is pivoted to a part of the frame and engages the clutch collar. Plows 23 are connected with the rear part of the frame for throwing dirt upon the fertilizer deposited upon the ground.

As will be seen I have provided means whereby two kinds of fertilizer or other material can be fed from the device at the same time. By moving the clutch into inoperative position the feed of material will be stopped while the implement continues to travel so that much material can be saved in this way as the feed can be stopped in turning at the ends of rows and when the device is being driven to and from the feed.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A device of the class described including a frame, a hopper carried thereby having a central discharge opening, a partition in said hopper extending from the top to the bottom thereof dividing the same into two separate chambers, a tubular member leading from each chamber to the central discharge opening, a worm in each chamber of said hopper having one end extending into the tubular member, an agitator in each chamber in said hopper actuated from the worm, and operating in a plane parallel with the worm, means for driving the worms, and clutch means for controlling the driving connection.

In testimony whereof I affix my signature.

JOHN ARTHUR THARRINGTON.